(12) United States Patent
Breslin et al.

(10) Patent No.: US 8,477,648 B2
(45) Date of Patent: Jul. 2, 2013

(54) SYSTEMS, APPARATUS, AND METHODS FOR MONITORING NETWORK CAPACITY

(75) Inventors: Terence M. Breslin, San Mateo, CA (US); David Kucharczyk, Santa Fe, NM (US); Jan Allen Hinshaw, Prescott Valley, AZ (US)

(73) Assignee: VSS Monitoring, Inc., San Mateo, CA (US)

( * ) Notice: Subject to any disclaimer, the term of this patent is extended or adjusted under 35 U.S.C. 154(b) by 269 days.

(21) Appl. No.: 13/028,917

(22) Filed: Feb. 16, 2011

(65) Prior Publication Data

US 2011/0199924 A1 Aug. 18, 2011

Related U.S. Application Data

(60) Provisional application No. 61/305,081, filed on Feb. 16, 2010.

(51) Int. Cl.
*H04L 12/26* (2006.01)

(52) U.S. Cl.
USPC ........................................................ 370/252

(58) Field of Classification Search
USPC .. 370/229, 230, 232, 233, 241, 252; 709/223, 709/224
See application file for complete search history.

(56) References Cited

U.S. PATENT DOCUMENTS

| | | | | |
|---|---|---|---|---|
| 5,751,698 A | * | 5/1998 | Cushman et al. | 370/252 |
| 5,867,483 A | * | 2/1999 | Ennis et al. | 370/252 |
| 6,173,325 B1 | * | 1/2001 | Kukreja | 709/224 |
| 6,894,972 B1 | * | 5/2005 | Phaal | 370/229 |
| 7,185,103 B1 | * | 2/2007 | Jain | 709/234 |
| 7,719,990 B2 | * | 5/2010 | Kojima | 370/252 |
| 8,036,113 B2 | * | 10/2011 | Kondapalli | 370/230 |
| 8,095,635 B2 | * | 1/2012 | Wang et al. | 709/223 |
| 8,102,782 B2 | * | 1/2012 | Pruthi et al. | 370/252 |
| 8,159,948 B2 | * | 4/2012 | Wakumoto | 370/233 |
| 2004/0196841 A1 | * | 10/2004 | Tudor et al. | 370/389 |
| 2010/0281388 A1 | * | 11/2010 | Kane et al. | 715/736 |
| 2011/0116510 A1 | * | 5/2011 | Breslin et al. | 370/411 |
| 2012/0030352 A1 | * | 2/2012 | Sauma Vargas et al. | 709/224 |

* cited by examiner

*Primary Examiner* — Chi Pham
*Assistant Examiner* — Robert Lopata
(74) *Attorney, Agent, or Firm* — Edwards Wildman Palmer LLP; Christopher J. Capelli; Scott D. Wofsy

(57) ABSTRACT

Methods, systems, and devices for monitoring network capacity and determining network utilization are herein disclosed. A traffic flow of captured data packets received at an ingress port of a network captured traffic distribution device may be sampled at a frequency corresponding to a first time period. The sample may be analyzed to determine whether, for example, the ingress port is active during the first time period. An increment may be added to a first counter based on a determination that the ingress port is active. The increments from a predefined plurality of first time periods may be aggregated and the predefined plurality of first time periods may correspond to a second time period. A second counter value may be generated for the second time period based on the aggregate and a percent utilization of the ingress port for the second time period may be determined based on the second counter value.

18 Claims, 5 Drawing Sheets

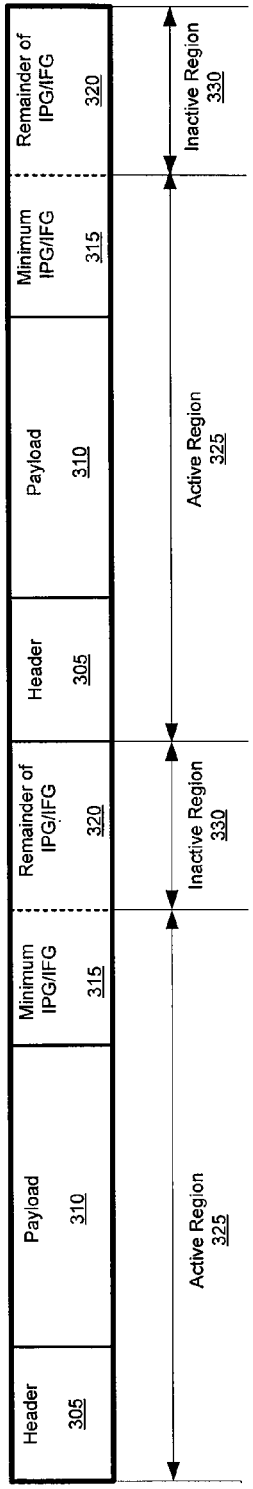
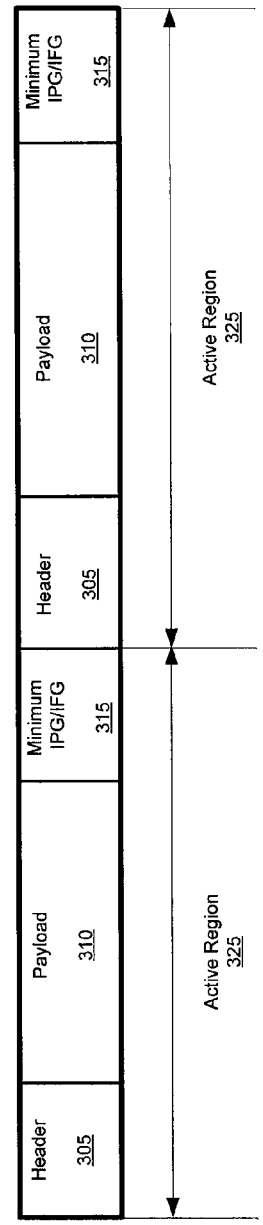
FIG. 3A
FIG. 3B

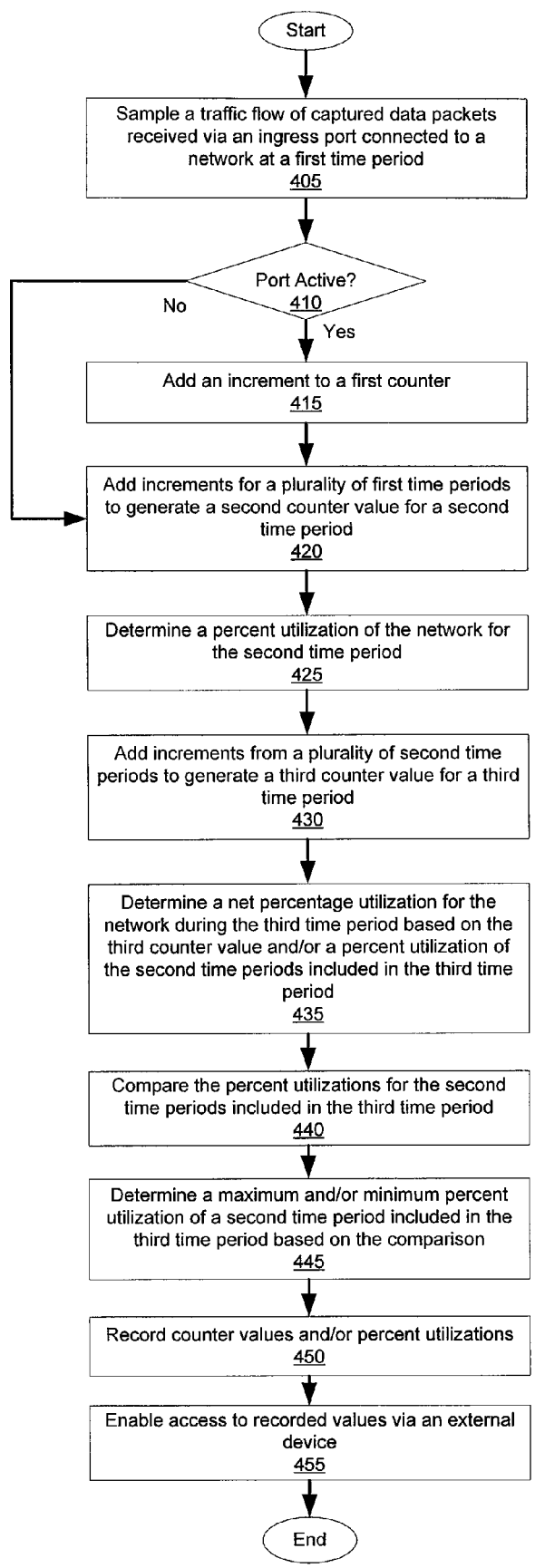

500

| | |
|---|---|
| Timestamp [505] | |
| Minimum % Utilization [510] | |
| Maximum % Utilization [515] | |
| Net % Utilization [520] | |
| Utilization Quanta [525] | |

Figure 5

SYSTEMS, APPARATUS, AND METHODS FOR MONITORING NETWORK CAPACITY

RELATED APPLICATION

This application is a NONPROVISIONAL of, claims priority to, and incorporates by reference U.S. Provisional Patent Application 61/305,081 filed Feb. 16, 2010.

FIELD OF INVENTION

This invention relates to methods, systems, and devices for monitoring network capacity.

BACKGROUND

Traditional methods, systems, and devices for monitoring network capacity are limited in the scope of network capacity and network utilization they can monitor. For example, traditional network monitors can only monitor network utilization by sampling network traffic with a periodic frequency on the order of seconds or minutes in duration. The duration of this time period is unacceptably long in certain situations when the monitoring of a network activity at the second, millisecond, microsecond, or even nanosecond is desired.

SUMMARY

Methods, systems, and devices for monitoring network capacity and determining network utilization are herein disclosed. In one embodiment, a traffic flow of captured data packets received via an ingress port of a network captured traffic distribution device communicatively coupled to a network may be continuously sampled at, for example, a frequency corresponding to a first time period.

In one embodiment, the duration of the first time period may correspond to a time period measured by, for example, a system clock associated with the network captured traffic distribution device and a rate at which the traffic flow of captured data packets is received via the ingress port. Exemplary rates at which the traffic flow may be received include one Gigabit per second, ten Gigabits per second, forty Gigabits per second, forty Gigabits per second via dense wavelength-division multiplexing, and one hundred Gigabits per second.

The sample may then be analyzed in order to, for example, determine whether the ingress port is active during the first time period. The ingress port may be determined to be active when it is, for example, receiving a data packet or any portion thereof, such as a header associated with a data packet, a payload associated with a data packet, and an interpacket gap (IPG)/interframe gap (IFG) associated with a data packet.

An increment may then be added to a first counter based on, for example, the determination. Then, the increments from a predefined plurality of first time periods may be aggregated. The predefined plurality of first time periods may correspond to, for example, a second time period. In some embodiments, the duration of the second time period is greater than the duration of the first time period. Next, a second counter value for the second time period may be generated based on, for example, the aggregate and a determination of a percent utilization of the ingress port for the second time period based on, for example, the second counter value.

In one embodiment, increments from a predefined plurality of second time periods may be aggregated and the predefined plurality of second time periods may correspond to a third time period. A third counter value may then be generated for the third time period based on the aggregate and a percent utilization of the ingress port for the third time period based may be determined, for example, on the third counter value.

In some instances, it may be determined whether a burst or microburst of traffic was received by the ingress port based on, for example, the second counter value, the third counter value, the percent utilization associated with a second time period, and/or the percent utilization associated with a third time period. Exemplary durations for the first, second, and third time periods include one nanosecond, one millisecond, and one second, respectively.

In one embodiment, the percent utilizations from a predefined plurality of second time periods may be aggregated and the number of second time periods in the predefined plurality of second time periods may correspond to a third time period. A net percent utilization of the ingress port for the third time period may then be determined based on, for example, the aggregate.

On some occasions, the percent utilizations for each of a predefined number of second time periods included in a third time period may be compared with one another. A second time period included in the third time period during which a minimum percent utilization occurred might also be determined based on, for example, the comparison. A second time period included in the third time period during which a maximum percent utilization occurred might also be determined based on, for example, the comparison.

On some occasions, the counter values, the percent utilization, the net percent utilization, the minimum percent utilization, and/or the maximum percent utilization may be recorded in a memory. A timestamp value may then be associated with the recorded data and, in at least one embodiment, the time stamp may also be recorded in a memory. In one instance, access to the recorded values by an external device and/or monitoring device may be enabled.

On one occasion, the network captured traffic distribution device includes a plurality of ingress ports and second counter value for at least two ingress ports, the third counter value for at least two ingress ports, the percent utilization associated with a second time period for at least two ingress ports, and/or the percent utilization associated with a third time period for at least two ingress ports may be aggregated. A percentage utilization of the network to which the network captured traffic distribution device is communicatively coupled may then be determined based on, for example, the aggregate.

Exemplary network captured traffic distribution device disclosed herein include an ingress port, an egress port, an application specific integrated circuit (ASIC), and a processor. The ingress port may receive a traffic flow of captured data packets from a source and the egress port may transmit data from the network captured traffic distribution device to, for example, an external device.

The ASIC may be communicatively coupled to the ingress port and the egress port and may be configured to forward data packets included in the traffic flow of captured data packets from the ingress port, for example, the egress port and/or the processor.

The processor may be communicatively coupled to the ASIC and may be configured to perform any of the methods described herein. For example, the processor may be configured to continuously sample a traffic flow of captured data packets received via the ingress port at a frequency corresponding to a first time period, analyze the sample determine whether the ingress port is active during the first time period based upon the analysis, add an increment to a first counter based on the determination, aggregate the increments from a predefined plurality of first time periods wherein the predefined plurality of first time periods correspond to a second time period, generate a second counter value for the second time period based on the aggregate, and/or determine a percent utilization of the ingress port for the second time period based on the second counter value.

On some occasions, the network captured traffic distribution device may further include a memory. The memory may be configured to, for example, record the second counter value and the determined percent utilization.

Exemplary systems described herein may include a source, a network captured traffic distribution device, and an external device. The source of captured network traffic may be coupled to the network captured traffic distribution device and may be configured to transmit captured network traffic to the network captured traffic distribution device.

The network captured traffic distribution device may be communicatively coupled to the source and/or external device and may be configured to perform any of the methods described herein. For example, the network captured traffic distribution device may be configured to continuously sample a traffic flow of captured data packets received via the ingress port at a frequency corresponding to a first time period, analyze the sample determine whether the ingress port is active during the first time period based upon the analysis, add an increment to a first counter based on the determination, aggregate the increments from a predefined plurality of first time periods wherein the predefined plurality of first time periods correspond to a second time period, generate a second counter value for the second time period based on the aggregate, and determine a percent utilization of the ingress port for the second time period based on the second counter value.

The external device may be communicatively coupled to the network captured traffic distribution device and may be enabled to receive data from the network captured traffic distribution device, such as the determined percent utilization from the network captured traffic distribution device.

BRIEF DESCRIPTION OF THE FIGURES

The present invention is illustrated by way of example, and not limitation, in the figures of the accompanying drawings in which:

FIG. 3A depicts an exemplary traffic flow of captured data packets wherein the utilization of an ingress port and/or a network is less than 100%, in accordance with an embodiment of the present invention;

FIG. 3B depicts an exemplary traffic flow of captured data packets wherein the utilization capacity of an ingress port and/or a network is 100%, in accordance with an embodiment of the present invention;

FIG. 4 is a flow chart depicting an exemplary process for monitoring the utilization of an ingress port and/or network, in accordance with an embodiment of the present invention; and FIG. 5 depicts an exemplary table of recorded values, in accordance with an embodiment of the present invention.

Figure 1:
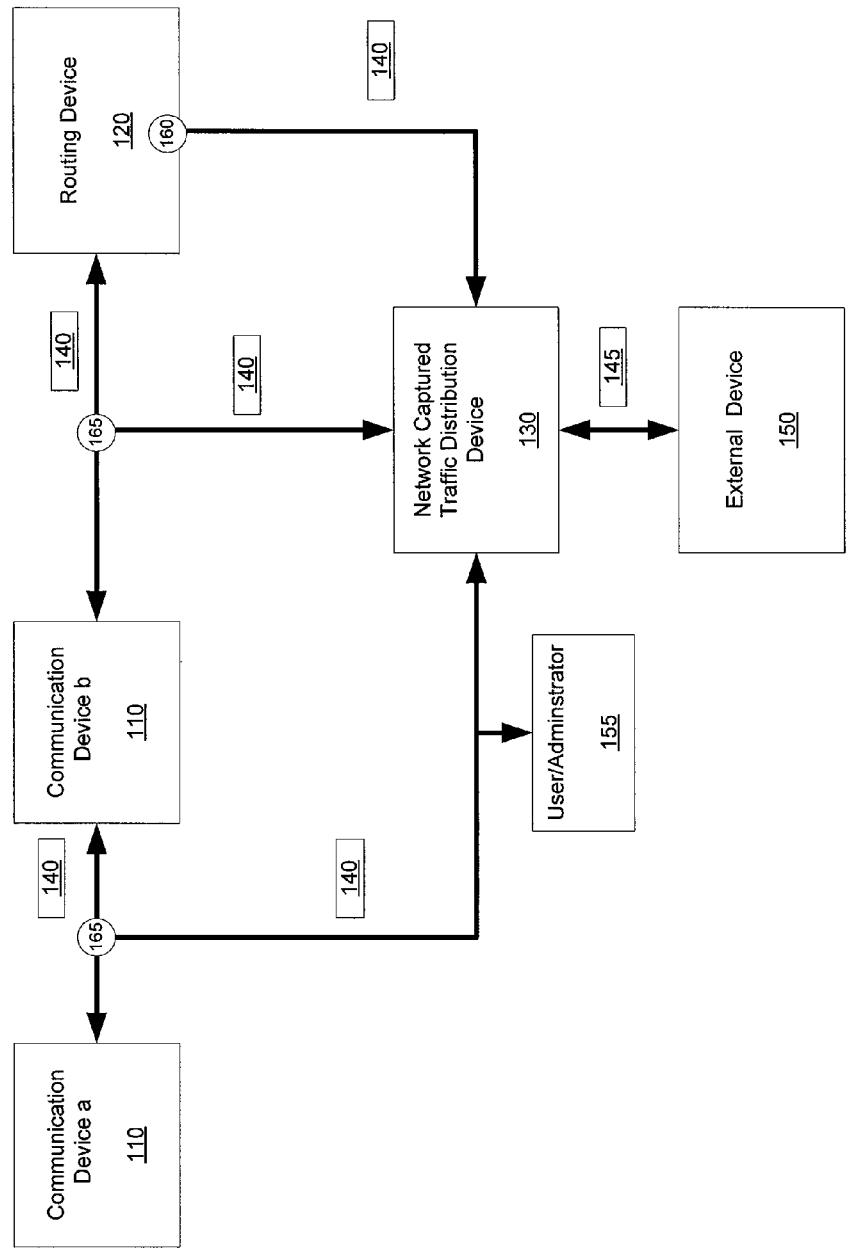
FIG. 1 is a block diagram depicting a network communication system, in accordance with an embodiment of a present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

WRITTEN DESCRIPTION

FIG. 1 is block diagram depicting a network communication system 100 in which one or more of the processes disclosed herein may be executed. System 100 may be, for example, a telecommunication system such as a Global System for Mobile communication (GSM) system or a multi-protocol label switching (MPLS) system. In some embodiments, system 100 may be Gateway General Packet Radio Service (GPRS) system, an Enhanced Data Rates for GSM Evolution (EDGE) system, an Enhanced GPRS (EGPRS) system, an International Mobile Telecommunications-2000 (IMT-2000) system, an IMT Single Carrier (IMT-SC) system, an Universal Mobile Telecommunications System (UMTS) system, a Long Term Evolution (LTE) system, a Code Division Multiple Access (CDMA) system, a system compliant with the IEEE 802.1 Q standard for configuring virtual LANs (VLAN), or a system enabled to transmit and/or receive data packets including VLAN tags. System 100 may also be a local area network (LAN) or a wireless LAN (WLAN).

The components of system 100 may be communicatively coupled via one or more communication links. The communication links may be any conventionally available communication link, such as a wireless link, or a wired link such as an Ethernet cable, a 10/100 Ethernet cable, a 1 gigabit Ethernet cable, a 10 gigabit Ethernet cable, a copper cable, and an optical fiber cable.

System 100 may include two communication devices 110a and 110b communicatively coupled to one another. Exemplary communication devices 110a and b include personal computers, mobile computing devices, and mobile telephones. Communication device 110a may generate a data packet 140 and transmit data packet 140 to a routing device, such as routing device 120, via a communication link. Routing device 120 may be any router enabled to route data packets through communication system 100. Communication device 110a may also receive a data packet 140 from communication device 110b via a communication link.

System 100 may also include a network captured traffic distribution device 130, which may be any network captured traffic distribution device capable of receiving captured network traffic. Network captured traffic distribution device 130 may include a plurality of ports by which the network captured traffic distribution device may communicate with another device included in system 100 and, receive and/or transmit captured traffic. In some cases, a port may be a monitor port or a stacking port. Network captured traffic distribution device 130 may also be communicatively coupled so as to provide information to and/or receive instructions from a user and/or administrator 155. User/administrator 155 may be, for example, a user and/or administrator of, for example, system 100 and/or network captured traffic distribution device 130.

Network captured traffic distribution device 130 may be communicatively coupled to a mirror port 160 present on routing device 120 via a port and may receive a traffic flow of captured data packets, including data packet 140, from routing device 120 via mirror port 160. Network captured traffic distribution device 130 may also be communicatively coupled to a traffic capture point 165 located along a communication link between communication device 110a and routing device 120 and/or between communication devices 110*a* and 110*b* and thereby may capture data packets, like data packet 140, via an inline network traffic capture at traffic capture point 165. Network captured traffic distribution device 130 may communicate modified data packet 145 to an external device 150 via, for example, a port. External device 150 may include multiple input/output ports that may operate in duplex or half-duplex mode. The input/output ports may be associated with configuration information and may be enabled to execute an auto-negotiation process. In some cases, an external port may be a small form-factor pluggable (SFP) port. Exemplary external devices 150 include network monitors and network analyzing devices.

Figure 2:
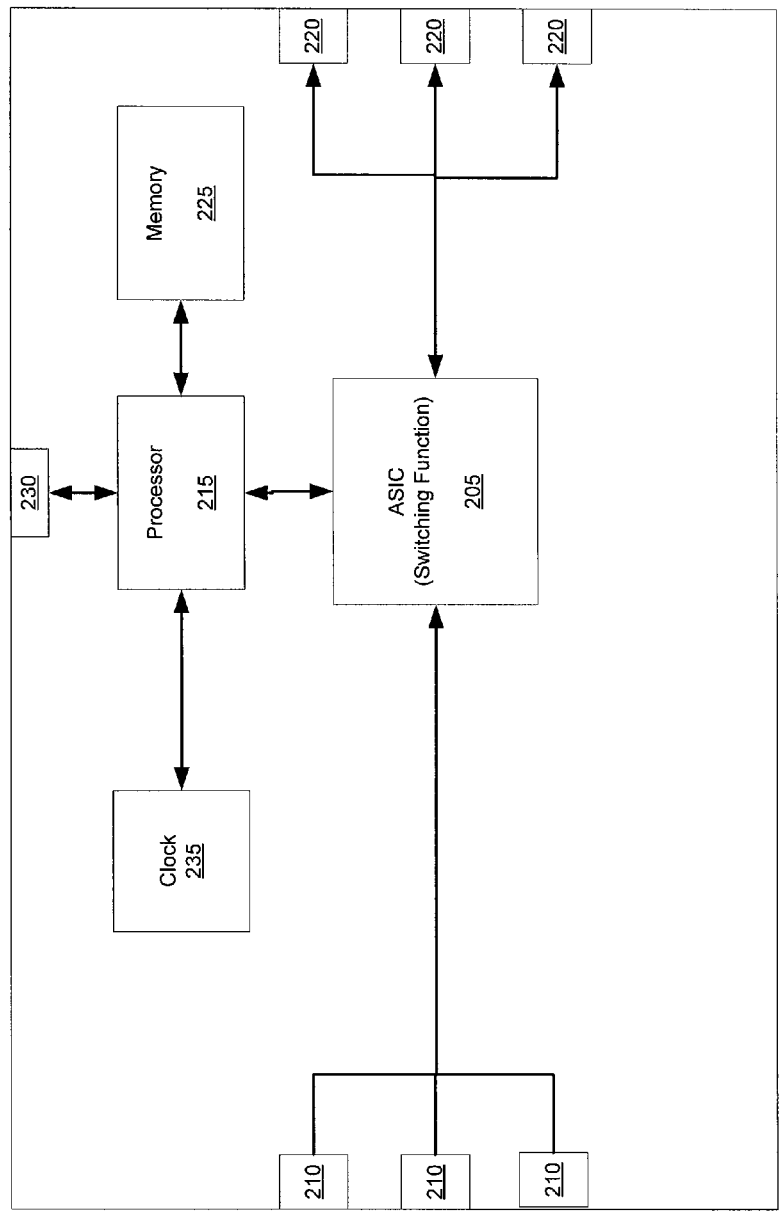
FIG. 2 is a block diagram depicting a network captured traffic distribution device, in accordance with an embodiment of the present invention.

FIG. 2 is a block diagram depicting network captured traffic distribution device 130. Network captured traffic distribution device 130 includes a plurality of ingress ports 210 and a plurality of egress ports 220. One or more egress ports 220 may be configured as a monitoring and/or stacking port. Data packets such as data packet 140 may be received by network captured traffic distribution device 130 via one or more ingress ports 210. Data packets may be received from a source of captured traffic, such as a mirror port, like mirror port 160, and/or inline traffic capture point, like inline traffic capture point 165.

Received data packets may be forwarded to application specific integrated circuit (ASIC) 235. ASIC 235 may be is communicatively coupled to ingress ports 210, processor 215, FPGA 240, and/or egress ports 220 and may perform a switching function, such as forwarding a data packet received by an ingress port 210 to, for example, processor 215 and/or an egress port 220.

Processor 215, which is communicatively coupled to ASIC 235, a memory 225, a system clock 235, an optional field programmable gate array (FPGA) 240, and/or a management port 230, may be any appropriate processing device, such as a central processing unit (CPU) and/or a FPGA and may execute one or more instructions resident in a memory 225. For example, processor 215 may be enabled to continuously sample a traffic flow of captured data packets received via the ingress port at a frequency corresponding to a first time period, analyze the sample to determine whether the ingress port is active during the first time period based upon the analysis, add an increment to a first counter based on the determination, aggregate the increments from a predefined plurality of first time periods wherein the predefined plurality of first time periods correspond to a second time period, generate a second counter value for the second time period based on the aggregate, and/or determine a percent utilization of the ingress port for the second time period based on the second counter value. Processor 215 may be managed by, for example, a user and/or administrator, like user/administrator 155 via, for example, a management port, like management port 230.

On some occasions, processor 215 may operate in conjunction with one or more FPGAs 240 to execute one or more of the processes described herein. FPGA 240 may be communicatively coupled to a plurality of ingress ports 210 (as shown) or an array of two or more FPGAs may be communicatively coupled to one or more of the plurality of ingress ports 210. In some embodiments, FPGA 240 may be included in processor 215 and/or may be communicatively coupled to processor 215.

FPGA 240 may be enabled to, for example, continuously sample a traffic flow of captured data packets received via the ingress port at a frequency corresponding to a first time period, analyze the sample to determine whether the ingress port is active during the first time period based upon the analysis, add an increment to a first counter based on the determination, aggregate the increments from a predefined plurality of first time periods wherein the predefined plurality of first time periods correspond to a second time period, generate a second counter value for the second time period based on the aggregate, and/or determine a percent utilization of the ingress port for the second time period based on the second counter value. Further details regarding the processes performed by processor 215 and/or FPGA(s) 240 are provided below with reference to FIGS. 4 and 5.

Memory 225 may be any appropriate data storage device and may store one or more instructions executable by processor 215, FPGA 240, and/or ASIC 235. Memory 225 may be any appropriate data storage device, like static random access memory (SRAM), dynamic random access memory (DRAM), read-only memory (ROM), flash memory, a magnetic computer storage device (e.g. hard disk, floppy disk, and magnetic tape), and optical media and may store one or more instructions executable by processor 215, FPGA 240, and/or ASIC 235.

System clock 235 may be enabled to determine a time that a data packet enters, for example, ingress port 210 and/or network captured traffic distribution device 130. In some embodiments, system clock 235 may be a counter and may, for example, determine a sequential order (e.g., 1, 2, 3) in which captured data packets are received by, for example, ingress port 210 and/or network captured traffic distribution device 130.

FIG. 3A depicts an exemplary traffic flow of captured data packets 301 wherein the utilization of the network via which the traffic flow of captured data packets is received is less than 100%. Traffic flow 301 may include one or more data packet(s) 140. Traffic flow 301 includes a plurality of data packets which, in turn, include a plurality of headers 305, a plurality of payloads 310, a plurality of minimum interpacket gaps (IPG)/interframe gaps (IFG) 315, a plurality of IPG/IFG remainders 320, a plurality of active regions 325, and a plurality of inactive regions 330. Traffic flow 301 may be received by, for example, a network captured traffic distribution device, such as network captured traffic distribution device 130 via, for example, an ingress port such as ingress port 210. Header 305 may be any header appropriate for the transmission of data packets through a network such as network 100. The size of header 305 may vary for individual data packets such that the plurality of headers 305 included in traffic flow 301 may not be uniform in size.

Payload 310 may be any payload appropriate to be included in a data packet transmitted via a network, such as network 100 and may include, for example, content information. The plurality of payloads 310 present in traffic flow 301 may vary in size and content.

Minimum IPG/IFG 315 may be defined by, for example, an industry standard for communications and/or communication protocols used to transmit a data packet in traffic flow 301 and/or a requirement of the equipment transmitting and/or receiving the data packets. An IPG/IFG between two data packets may be of any size, and any remaining gap between two data packets, in excess of the minimum IPG/IFG 315, may be included in the remainder of IPG/IFG 320. The remainder IPG/IFG 320 may be of any length and may be dependent upon, for example, the frequency with which data packets are transmitted via network 100 and/or received via an ingress port such as ingress port 210.

An ingress port and/or network may be in an active state 325 when, for example, it is receiving a data packet, like data packet 140, or any portion thereof. Exemplary portions of a data packet include header 305 and/or payload 310 and/or during minimum IPG/IFG 315. An ingress port and/or network may be in an inactive state 330 during the remainder IPG/IFG 320 or when it is not receiving and/or transmitting a data packet.

FIG. 3B depicts a traffic flow of captured data packets 302 wherein the network transmitting the traffic and/or ingress port receiving traffic flow 302 is at or near 100% utilization. Traffic flow 302 may include one or more data packet(s) 140. As can be seen in FIG. 3B, traffic flow 302 includes a plurality of active regions 325 and data packets which include header 305, payload 310, minimum IPG/IFG 315. However, there is no remainder IPG/IFG 320 between two data packets. In this way traffic flow 302, represents 100% utilization capacity in that there is no inactive time between receptions of data packets.

FIG. 4 depicts a process 400 for monitoring the utilization of an ingress port, like ingress port 210 and/or a network, like network 100. Process 400 may be performed by, for example, any of the systems and/or devices disclosed herein. For example, process 400 may be performed by a network, like network 100, a network captured traffic distribution device, like network captured traffic distribution device 130, a processor like processor 215, a FPGA like FPGA 240, and/or some combination thereof.

In step 405, a traffic flow of captured data packets, such as traffic flows 301 and/or 302, may be received via an ingress port such as ingress port 210. The ingress port may be resident in a network captured traffic distribution device, like network captured traffic distribution devices 130. The ingress port and/or network captured traffic distribution device may be communicatively coupled to a network, such as network 100. The received traffic flow may be sampled, for example, periodically, randomly, and/or continuously. In some cases, the duration of the period at which the traffic flow is sampled may correspond to a first time period. In one exemplary embodiment, the first time period may be approximately equal to 1 nanosecond.

In step 410, it may be determined whether the ingress port is active. The determination at step 410 may be based upon an analysis of the samples obtained during performance of step 405. An ingress port may be determined to be active when the ingress port is receiving, for example, a data packet, such as data packet 140, or a portion thereof, such as a header like header 305, and/or a payload, such as payload 310. An ingress port may also be active during a minimum IPG/IFG, such as minimum IPG/IFG 315. A determination that an ingress port is active may correspond to active region 325, as discussed above with regard to FIGS. 3A and 3B. An ingress port may be determined to be inactive when it is not receiving a data packet and/or a portion thereof, such as header 305, payload 310, and/or IPG/IFG 320. In some embodiments, an inactive determination may correspond to inactive state 330, as discussed above with regard to FIGS. 3A and 3B.

When a port is determined to be active, an increment may be added to a first counter (step 415). In step 420, increments for a plurality of first time periods may be added together to generate a second counter value for a second time period. In embodiments wherein the port is determined not to be active, step 420 may be performed directly after step 410. In most cases, the duration of the second time period may be greater than the duration of the first time period. Continuing with the exemplary embodiment discussed above, the second time period may be approximately equivalent to one millisecond.

In step 425, a percent utilization of an ingress port via which the traffic flow of captured data packets is received, may be determined for the second time period such that, for example, a value of 100% is approximately equivalent to a maximum utilization capacity in a time period and a value of 0% is approximately equivalent to minimum utilization capacity time period.

In step 430, increments from a plurality of second time periods may be added together to generate a third counter value for a third time period. In some cases, the number of second time periods included in a third time period may be predefined. Continuing with the exemplary embodiment mentioned above, the third time period may be approximately equivalent to one second. In step 435, a net percentage utilization for the network and/or ingress port during the third time period may be determined. This determination may be based on, for example, the third counter value, a percentage utilization, and/or an aggregate of percentage utilization values of the second time periods included in the third time period.

In step 440, the percent utilizations for individual and/or groups of second time periods included in a third time period may be compared with one another. A maximum and/or a minimum percent utilization that occurs within a second time period that is included within the third time period may be determined based upon the comparison in step 440.

In some instances, a network captured traffic distribution device may include a plurality of ingress ports. In this instance, step 440 may include aggregating one or more second counter values for at least two ingress ports, the third counter value for at least two ingress ports, the percent utilization associated with a second time period for at least two ingress ports, and/or the percent utilization associated with a third time period for at least two ingress ports and determining a percentage utilization of the network to which the network captured traffic distribution device is communicatively coupled based on the aggregate.

In step 450, the percent utilization values and/or the values for the first, second, and/or third counter values may be recorded in, for example, a memory such as memory 225. In some instances, a timestamp may be associated with one or more recorded values. A timestamp may be a value that may indicate, for example, the ingress port via which a traffic flow of captured data packets is received. In some embodiments a timestamp may be a binary value of, for example, 32-bits in length and may be represented in, for example, a big-endian format. A timestamp may include a port stamp or an ingress port I.D. A timestamp may also include a time value indicating when data is received and/or a sequential number such as 1, 2, 3, etc., for each successive set of data or a data packet that is received in a sequence. For embodiments wherein a network captured traffic distribution device, like network captured traffic distribution device 130, includes multiple ingress ports each ingress port may generate a unique value, or ingress port identifier, to be included in the timestamp such that recorded data for each ingress port may be differentiated from each other. In step 455, the recorded values may be reported to and/or retrieved by an external device such as external device 150 via, for example, an egress port such as egress port 220. Following step 455, process 400 may end.

FIG. 5 depicts an exemplary table 500 showing data relating to a time period, for example, a second or third time period, timestamps, recorded counter values, and/or percent utilizations as determined by process 400. Table 500 may include, for example, an entry for a timestamp 505, a minimum % utilization 510, a maximum % utilization 515, a net % utilization 520 and/or a utilization quanta/counter value 525. Table 500 may be generated by, for example, network captured traffic distribution device 130, FPGA 240, and/or processor 215. Table 500 may be recorded in, for example, a memory such as memory 225 and/or may be reported to and/or retrieved by an external device such as external device 150 via an egress port, such as egress port 220.

Minimum % utilization 510 may be the minimum percent utilization over a given time period, such as the second time period as discussed above with reference to FIG. 4, and/or may correspond to a sampling interval during which a minimum percent utilization occurred. Minimum % utilization may be determined via, for example, step 445 of process 400. Maximum % utilization 515 may be a maximum percent utilization over a given time period, such as the second time period as discussed above with reference to FIG. 4, and/or may correspond to a sampling interval during which the maximum percent utilization occurred. Maximum % utilization 415 may also be determined via step 445 of process 400.

Net % utilization 520 may indicate a net percent utilization that occurs over a given time period such as the third time period as discussed above with reference to FIG. 4. Net % utilization 520 may be determined via, for example, step 435 of process 400. Utilization quanta/counter value 525 may be representative of increments added to, for example, the first counter, the second counter, and/or the third counter as mentioned with reference to FIG. 4 and may be determined via, for example, steps 415, 430 and/or 430.

As indicated above, in varying embodiments the invention provides a method that includes continuously sampling, at a frequency corresponding to a first time period, a traffic flow of captured data packets received via an ingress port of a network captured traffic distribution device communicatively coupled to a network, analyzing the sample, determining whether the ingress port is active during the first time period based upon the analysis, adding an increment to a first counter based on the determination, aggregating the increments from a predefined plurality of first time periods wherein the predefined plurality of first time periods correspond to a second time period, generating a second counter value for the second time period based on the aggregate, and determining a percent utilization of the ingress port for the second time period based on the second counter value. The duration of the first time period may correspond to at least one of a system clock associated with the network captured traffic distribution device and a rate at which the traffic flow of captured data packets is received via the ingress port. The rate of incoming captured data packets may be equivalent to at least one of one Gigabit per second, ten Gigabits per second, forty Gigabits per second, forty Gigabits per second via dense wavelength-division multiplexing, and one hundred Gigabits per second. The duration of the second time period may be greater than the duration of the first time period. In some instances, the ingress port will be determined to be active when it is receiving at least one of a header associated with a data packet, a payload associated with a data packet, and/or an IPG/IFG associated with a data packet.

In further instances, the methods of the present invention may include aggregating the increments from a predefined plurality of second time periods, wherein the predefined plurality of second time periods correspond to a third time period; generating a third counter value for the third time period based on the aggregate; and determining a percent utilization of the ingress port for the third time period based on the third counter value. Also, the present methods may include aggregating the percent utilizations from a predefined plurality of second time periods, wherein the predefined plurality of second time periods correspond to a third time period; and determining a net percent utilization of the ingress port for the third time period based on the aggregate.

The present methods may additionally include comparing the percent utilizations for each of a predefined number of second time periods included in a third time period with one another; determining a second time period included in the third time period during which a minimum percent utilization occurred, based on the comparison; and determining a second time period included in the third time period during which a maximum percent utilization occurred, based on the comparison.

Alternatively, or in addition, the present methods may include recording at least one of the counter values, the net percent utilization, the minimum percent utilization, and the maximum percent utilization in a memory; and/or associating a timestamp value with the recorded data, and recording the time stamp.

The methods of the present invention may also include enabling access to the recorded values by an external device.

The present methods may further include determining whether a microburst of traffic was received by the ingress port based on at least one of the second counter value, the third counter value, the percent utilization associated with a second time period, and the percent utilization associated with a third time period. Further, the network captured traffic distribution device may include a plurality of ingress ports, and the present methods may include aggregating at least one of the second counter value for at least two ingress ports, the third counter value for at least two ingress ports, the percent utilization associated with a second time period for at least two ingress ports, and the percent utilization associated with a third time period for at least two ingress ports; and determining a percentage utilization of the network to which the network captured traffic distribution device is communicatively coupled based on the aggregate. The first time period may be approximately equal to one nanosecond, the second time period may be approximately equal to one millisecond, and the third time period may be approximately equal to one second.

Thus, systems, apparatus, and methods for determining the capacity of an ingress port and network have been herein described.

The invention claimed is:

1. A method comprising:
   continuously sampling, at a frequency corresponding to a first time period, a traffic flow of captured data packets received via an ingress port of a network captured traffic distribution device communicatively coupled to a network;
   analyzing, by the network captured traffic distribution device, the sample;
   determining, by the network captured traffic distribution device, whether the ingress port is active during the first time period based upon the analysis;
   adding, by the network captured traffic distribution device, an increment to a first counter based on the determination;
   aggregating, by the network captured traffic distribution device, the increments from a predefined plurality of first time periods wherein the predefined plurality of first time periods correspond to a second time period;
   generating, by the network captured traffic distribution device, a second counter value for the second time period based on the aggregate; and
   determining, by the network captured traffic distribution device, a percent utilization of the ingress port for the second time period based on the second counter value.

2. The method of claim 1, wherein the duration of the first time period corresponds to at least one of a time period measured by a system clock associated with the network captured traffic distribution device, a number of captured data packets received via the ingress port, and a rate at which the traffic flow of captured data packets is received via the ingress port.

3. The method of claim 2, wherein the rate of incoming captured data packets correspond to a rate of at least one of one Gigabit per second, ten Gigabits per second, forty Gigabits per second, forty Gigabits per second via dense wavelength-division multiplexing, and one hundred Gigabits per second.

4. The method of claim 1, wherein the duration of the second time period is greater than the duration of the first time period.

5. The method of claim 1, further comprising:
aggregating, by the network captured traffic distribution device, the increments from a predefined plurality of second time periods wherein the predefined plurality of second time periods correspond to a third time period;
generating, by the network captured traffic distribution device, a third counter value for the third time period based on the aggregate; and
determining, by the network captured traffic distribution device, a percent utilization of the ingress port for the third time period based on the third counter value.

6. The method of claim 1, further comprising:
aggregating, by the network captured traffic distribution device, the percent utilizations from a predefined plurality of second time periods wherein the predefined plurality of second time periods correspond to a third time period;
determining, by the network captured traffic distribution device, a net percent utilization of the ingress port for the third time period based on the aggregate.

7. The method of claim 1, further comprising:
comparing, by the network captured traffic distribution device, the percent utilizations for each of a predefined number of second time periods included in a third time period with one another;
determining, by the network captured traffic distribution device, a second time period included in the third time period during which a minimum percent utilization occurred, based on the comparison, and
determining, by the network captured traffic distribution device, a second time period included in the third time period during which a maximum percent utilization occurred, based on the comparison.

8. The method of claim 1 further comprising:
recording, by the network captured traffic distribution device, at least one of the counter values and the percent utilization in a memory.

9. The method of claim 8, further comprising:
associating, by the network captured traffic distribution device, a timestamp value with the recorded data; and
recording, by the network captured traffic distribution device, the time stamp in the memory.

10. The method of claim 8, further comprising:
enabling, by the network captured traffic distribution device, access to the recorded values by an external device.

11. The method of claim 1, wherein the ingress port is determined to be active when it is receiving at least one of a header associated with a data packet, a payload associated with a data packet, and an interpacket gap (IPG)/interframe gap (IFG) associated with a data packet.

12. The method of claim 1, further comprising:
determining, by the network captured traffic distribution device, whether a burst of traffic was received by the ingress port based on at least one of the second counter value, and the percent utilization associated with a second time period.

13. The method of claim 1, wherein the network captured traffic distribution device includes a plurality of ingress ports, the method further comprising:
aggregating, by the network captured traffic distribution device, at least one of the second counter value for at least two ingress ports, and the percent utilization associated with a second time period for at least two ingress ports; and
determining, by the network captured traffic distribution device, a percentage utilization of the network to which the network captured traffic distribution device is communicatively coupled based on the aggregate.

14. The method of claim 1, wherein the first time period is approximately equal to one nanosecond and the second time period is approximately equal to one millisecond.

15. A network captured traffic distribution device comprising:
an ingress port for receiving a traffic flow of captured data packets from a source of captured data packets;
an egress port for transmitting data from the network captured traffic distribution device;
an application specific integrated circuit (ASIC) communicatively coupled to the ingress port and the egress port, the ASIC being configured to forward data packets included in the traffic flow of captured data packets from the ingress port to at least one of the egress port and a processor; and
the processor communicatively coupled to the ASIC, wherein the processor is configured to continuously sample a traffic flow of captured data packets received via the ingress port at a frequency corresponding to a first time period, analyze the sample determine whether the ingress port is active during the first time period based upon the analysis, add an increment to a first counter based on the determination, aggregate the increments from a predefined plurality of first time periods wherein the predefined plurality of first time periods correspond to a second time period, generate a second counter value for the second time period based on the aggregate, and determine a percent utilization of the ingress port for the second time period based on the second counter value.

16. The network captured traffic distribution device of claim 15, further comprising:
a memory, communicatively coupled to the processor, for recording the second counter value and the determined percent utilization.

17. The network captured traffic distribution device of claim 15, further comprising:
a field programmable gate array (FPGA) communicatively coupled to the ingress port, processor, and ASIC, wherein the FPGA is configured to continuously sample a traffic flow of captured data packets received via the ingress port at a frequency corresponding to a first time period, analyze the sample determine whether the ingress port is active during the first time period based upon the analysis, add an increment to a first counter based on the determination, aggregate the increments from a predefined plurality of first time periods wherein the predefined plurality of first time periods correspond to a second time period, generate a second counter value for the second time period based on the aggregate, and determine a percent utilization of the ingress port for the second time period based on the second counter value in conjunction with the processor.

18. A system comprising:

a source of captured network traffic communicatively coupled to a network captured traffic distribution device, the source being configured to transmit captured network traffic to the network captured traffic distribution device;

the network captured traffic distribution device communicatively coupled to an external device the network captured traffic distribution device and configured to continuously sample a traffic flow of captured data packets received via the ingress port at a frequency corresponding to a first time period, analyze the sample determine whether the ingress port is active during the first time period based upon the analysis, add an increment to a first counter based on the determination, aggregate the increments from a predefined plurality of first time periods wherein the predefined plurality of first time periods correspond to a second time period, generate a second counter value for the second time period based on the aggregate, and determine a percent utilization of the ingress port for the second time period based on the second counter value; and the external device communicatively coupled to the network captured traffic distribution device, the external device being enabled to receive the determined percent utilization from the network captured traffic distribution device.

* * * * *